No. 618,322. Patented Jan. 24, 1899.
L. J. & A. L. BARTHELEMY.
FILTER APPARATUS.
(Application filed Apr. 7, 1898.)

(No Model.) 2 Sheets—Sheet 1.

No. 618,322. Patented Jan. 24, 1899.
L. J. & A. L. BARTHELEMY.
FILTER APPARATUS.
(Application filed Apr. 7, 1898.)

(No Model.) 2 Sheets—Sheet 2.

Witnesses:

Inventors
A. L. Barthelemy &
L. J. Barthelemy
By James J. Sheehy
Attorney

UNITED STATES PATENT OFFICE.

LOUIS J. BARTHELEMY AND ARISTIDE L. BARTHELEMY, OF NEW ORLEANS, LOUISIANA.

FILTER APPARATUS.

SPECIFICATION forming part of Letters Patent No. 618,322, dated January 24, 1899.

Application filed April 7, 1898. Serial No. 676,820. (No model.)

*To all whom it may concern:*

Be it known that we, LOUIS J. BARTHELEMY and ARISTIDE L. BARTHELEMY, citizens of the United States, residing at New Orleans, in the parish of Orleans and State of Louisiana, have invented new and useful Improvements in Filter Apparatus, of which the following is a specification.

Our invention relates to filter apparatus, and more particularly to that class of apparatus designed for the filtration of solutions obtained from sugar-bearing plants. Its novelty and many advantages will be fully understood from the following description and claims when taken in conjunction with the annexed drawings, in which—

Figure 1:
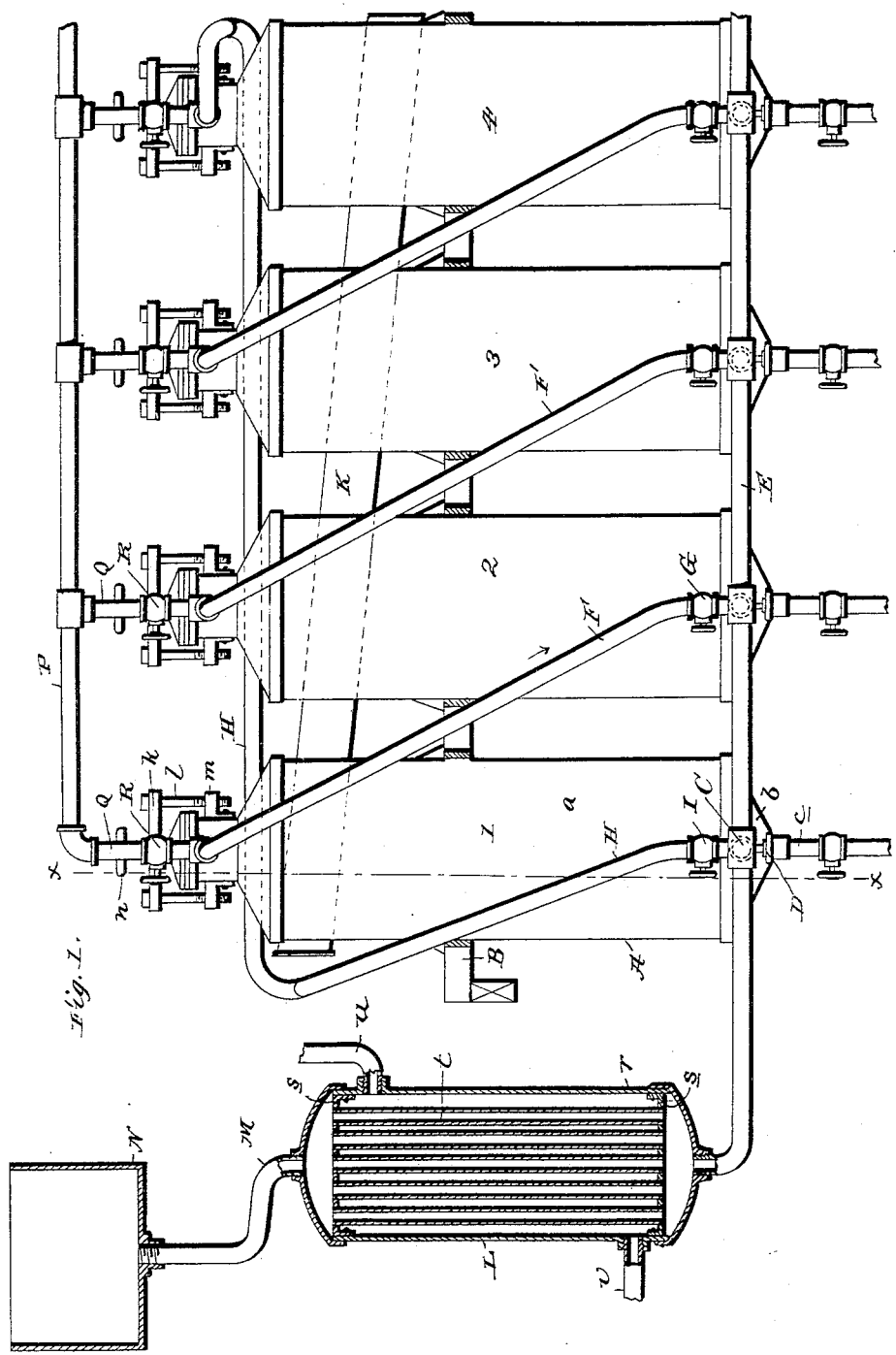
Figure 2:
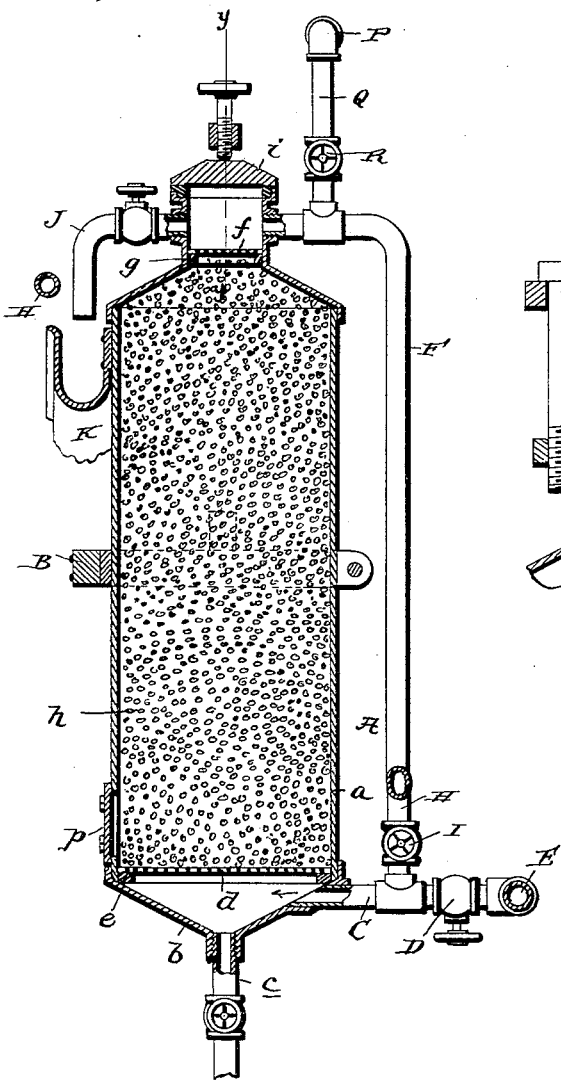
Figure 3:
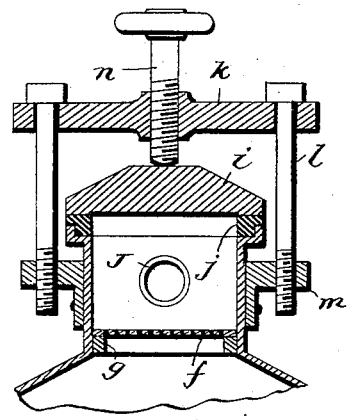

Figure 1 is a side elevation of our improved apparatus with some of the parts in section. Fig. 2 is an enlarged section taken in the plane indicated by the line $x\ x$ of Fig. 1. Fig. 3 is an enlarged detail section taken in the plane indicated by the line $y\ y$ of Fig. 2.

Referring by letter to the said drawings, A designates the filters comprised in our apparatus, the same being numbered 1, 2, 3, and 4 for the sake of convenience of description. These filters A being similar in construction, a description of the one shown in Fig. 2 will suffice for all. The said filter comprises a shell $a$, having the cone-shaped bottom $b$ and the valved drain-pipe $c$ for the discharge of water employed in washing the filter, a foraminated diaphragm $d$, mounted on a ledge $e$ in the shell, a body of gravel $h$, arranged on said diaphragm, a diaphragm $f$, mounted on a ledge $g$ and having for its purpose to prevent the gravel from gaining access to the pipes presently described, and a closure for the upper end of the shell, made up of a cap $i$, a gasket $j$, interposed between the cap and shell, a head $k$, having a central threaded aperture, bolts $l$, extending through the head and threaded to take into the threaded apertures of lugs $m$, secured at opposite sides of the shell, and a hand-screw $n$, taking through the threaded aperture of the head and impinging at its lower end on the cap. This construction of closure is desirable because it effectually prevents leakage at the upper end of the shell and yet permits of access being readily gained to the space above the upper diaphragm $f$ when it is necessary to clean the said diaphragm and clear the space above the same and the pipes communicating therewith of sediment. The gravel, which may be introduced at the top of the cylinder and removed through the manhole $p$ when necessary, is particularly desirable in a filter employed in filtering solutions obtained from sugar-bearing plants, because it is not absorbent and also because it may be cleansed of sediment with great facility.

As best shown in Fig. 1, each of the filters A has its lower end connected by a pipe C, having a valve D, with a common supply-pipe E. Each filter excepting the last one (numbered 4) also has its upper end connected by a pipe F, having a valve G, with the pipe C of the next forward filter. For instance, the upper end of filter 1—*i. e.*, the space above diaphragm $f$—is connected by a pipe F with the pipe C of filter No. 2, the upper end of filter No. 2 is connected with the pipe C of filter No. 3, and the upper end of filter No. 3 is connected with the pipe C of filter No. 4. The upper end of the said filter No. 4 is connected in turn by a pipe H, having a valve I, with the pipe C of filter No. 1, for a purpose presently described.

Connected with the spaces above the diaphragms $f$ of the plurality of filters are valved discharge-spouts J, and arranged below the several spouts J is a fixed trough or conveyer K, which has for its purpose to carry the filtered liquid as it is received from the spouts to a vessel placed to receive it. At one end the supply-pipe E is connected to a suitable heater L, which in turn is connected by a pipe M with a tank N, the said tank being preferably arranged in a plane above the filters, so as to cause the solution to enter the filters under considerable head. In lieu of this, when desired a pump or other suitable means may be employed for forcing the solution through the filters. In the preferred embodiment of the invention the heater L comprises a shell $r$, having heads $s$, tubes $t$, connected to said heads and effecting communication between opposite ends of the shell, a pipe $u$ for feeding steam or some other suitable heating agent to the space between the heads s, and a pipe v for discharging the said space of the steam or other heating agent.

In order to enable the attendant to quickly clean any one of the several filters when necessary, I provide a pipe P, which is connected by branches Q, having valves R, with the pipes F and H and is designed to be connected with a suitable source of steam and hot-water supply. (Not illustrated.)

In the practical operation of the invention the solution to be filtered is first subjected to a heat of about 200° Fahrenheit in order to render it better susceptible to filtration and is then passed through one, two, three, or four of the filters A, according to the measure of filtration desired. The valves are manipulated so as to cause the solution to take passage through pipe E, the pipe C, leading to bottom of filter No. 1, through the filtering material of said filter, and out through the spout J thereof into the trough K. When a double filtration is desired, the valve in the spout of the filter No. 1 is closed and that of the pipe F, leading from filter No. 1, is opened, so as to cause the solution when it reaches the upper end of the filter No. 1 to pass through the pipes F and C into the lower end of filter No. 2, from the upper end of which it passes out through the spout J. When triple filtration is desired, the valve in the spout J of filter No. 2 is closed and the solution is caused to take passage through the pipes F and C into and through the filter No. 3 and out of the same by the spout J thereof. When quadruple filtration is desired, the discharge-spout of filter No. 3 is closed and the solution is caused to take passage from the upper end of the said filter No. 3 through pipes F C into and through the filter No. 4 and out of the same by its spout J. When it is desirable to refilter the solution, the valve in the spout J of filter No. 4 is closed and the solution is caused to take passage from the upper end of the said filter No. 4 through the pipe H and the pipe C of filter No. 1, into and through the said filter No. 1. It is obvious that the refiltration of the solution may consist in passing the same through one, two, three, or four of the filters comprised in the battery, as desired. It is also obvious that the battery of filters may comprise four, or more or less than four, filters, as desirable.

The arrangement of the pipes and valves is such that the initial filtration of the solution or a single filtration thereof may take place in any one of the filters of the battery. For instance, if the usefulness of the filter No. 1 becomes impaired by reason of the collection of sediment therein, as is likely to happen because of the first filtration taking place therein, the said filter No. 1 may be cut out from the battery and the solution caused to take passage through the pipe C of filter No. 2 into said filter. With this done it is simply necessary for the attendant in order to cleanse the filter No. 1 to open the valve in the drain-pipe c of said filter and also open the valve R of the branch Q of the steam or hot-water supply pipe which leads to the upper end of filter No. 1 and let the steam and water pass through said filter until the pipe c discharges clean water, and thereby apprises the operator of the fact that the filter is cleansed. At the completion of the cleansing operation the supply of steam and hot water is shut off, after which the filter No. 1 may be again connected with the supply-pipe E and used alone or in conjunction with the other filters, as desired.

While our improved apparatus is designed more especially for the filtration of solutions obtained from sugar-bearing plants, it is adapted to be used to advantage in the filtration of other liquids.

Having described our invention, what we claim, and desire to secure by Letters Patent, is—

1. A filter apparatus comprising a plurality of filters having valved discharge-spouts adjacent to their upper ends, a common supply-pipe, valved pipes intermediate of the supply-pipe and the lower ends of the several filters, and valved pipes connected at one end to the upper ends of the filters and at their lower ends to the intermediate pipes leading to the next filters of the series at points between the valves of the intermediate pipes and the filters, substantially as specified.

2. A filter apparatus comprising a plurality of filters having discharge-spouts adjacent to their upper ends, a common trough or conveyer arranged to receive from the several discharge-spouts, a common supply-pipe, valved pipes intermediate of the supply-pipe and the lower ends of the several filters and valved pipes connected at one end to the upper ends of the filters and at their lower ends to the intermediate pipes leading to the next filters of the series at points between the valves of the intermediate pipes and the filters substantially as specified.

3. A filter apparatus comprising a plurality of filters having valved discharge-spouts adjacent to their upper ends and valved drain-pipes at their lower ends, a common supply-pipe, valved pipes intermediate of the supply-pipe and the lower ends of the several filters, valved pipes connected at one end to the upper ends of the filters and extending downwardly and connected at their lower ends to the intermediate pipes leading to the next filters of the series at points between the valves of the intermediate pipes and the filters and a steam or hot-water supply pipe having branches connected to the downwardly-extending pipes at points between the valves thereof and the upper ends of the filters, substantially as specified.

4. A filter apparatus comprising a plurality of filters having valved discharge-spouts adjacent to their upper ends, a common supply-pipe, valved pipes intermediate of the supply-pipe and the lower ends of the several filters, valved pipes connected at one end to the upper ends of the filters and at their lower ends to the intermediate pipes leading to the next filters of the series, and a valved pipe leading from the upper end of the last filter back to the intermediate pipe leading to the lower end of the first filter for refiltration purposes, substantially as specified.

5. In a filter apparatus a plurality of filters respectively comprising a shell having a valved discharge-spout adjacent to its upper end, lower and upper foraminated diaphragms, a body of gravel interposed between said diaphragms, and a removable cap, a supply common to the several filters, valved pipes intermediate of the supply-pipe and the lower ends of the several filters, and valved pipes connected at one end to the upper ends of the filters and at their lower ends to the intermediate pipes leading to the next filters of the series at points between the valves of the intermediate pipes and the filters, substantially as specified.

In testimony whereof we have hereunto set our hands in presence of two subscribing witnesses.

LOUIS J. BARTHELEMY.
ARISTIDE L. BARTHELEMY.

Witnesses:
W. E. BAMOND,
STEPHEN MASCARO.